(12) United States Patent
Städtler et al.

(10) Patent No.: US 12,383,922 B2
(45) Date of Patent: Aug. 12, 2025

(54) WATER OUTLET

(71) Applicant: Neoperl GmbH, Müllheim (DE)

(72) Inventors: Georg Städtler, Müllheim (DE); Sascha Horoba, Gottenheim (DE); David Birmelin, Müllheim (DE)

(73) Assignee: Neoperl GmbH, Müllheim (DE)

( * ) Notice: Subject to any disclaimer, the term of this patent is extended or adjusted under 35 U.S.C. 154(b) by 342 days.

(21) Appl. No.: 18/031,647

(22) PCT Filed: Aug. 17, 2021

(86) PCT No.: PCT/EP2021/072803
§ 371 (c)(1),
(2) Date: Apr. 13, 2023

(87) PCT Pub. No.: WO2022/083917
PCT Pub. Date: Apr. 28, 2022

(65) Prior Publication Data
US 2023/0381804 A1    Nov. 30, 2023

(30) Foreign Application Priority Data
Oct. 20, 2020 (DE) .......................... 202020105991.2

(51) Int. Cl.
*B05B 15/65* (2018.01)
*B05B 15/40* (2018.01)
*F16L 37/24* (2006.01)

(52) U.S. Cl.
CPC .............. *B05B 15/65* (2018.02); *B05B 15/40* (2018.02); *F16L 37/24* (2013.01)

(58) Field of Classification Search
CPC .......... B05B 15/40; B05B 15/65; F16L 37/08; F16L 37/24
USPC ...... 239/575, 589, 590–590.5, 600; 285/305, 285/921; 4/675–678
See application file for complete search history.

(56) References Cited

U.S. PATENT DOCUMENTS

| | | | |
|---|---|---|---|
| 4,588,131 A * | 5/1986 | Yamamoto | B05B 7/0062 239/600 |
| 4,682,798 A | 7/1987 | Sauer | |
| 7,699,241 B2 * | 4/2010 | Benstead | E03C 1/0404 239/589 |
| 9,027,860 B2 * | 5/2015 | Morgan | B05B 1/3426 239/590 |

(Continued)

FOREIGN PATENT DOCUMENTS

| | | |
|---|---|---|
| CN | 203769006 | 8/2014 |
| DE | 8513518 | 6/1985 |

*Primary Examiner* — Steven J Ganey
(74) *Attorney, Agent, or Firm* — Volpe Koenig

(57) ABSTRACT

A water outlet (1) or a line coupling, which has an inflow-proximal first coupling or outlet part (2) and an outflow-proximal second coupling or outlet part (3), which (2, 3) are movable between a releasing position and a use position, in which use position the coupling or outlet parts (2, 3) in each case configured so as to be sleeve-shaped are connected to one another in the flow direction and are releasably fixed to one another by a threadless quick-release coupling (4). The water outlet (1) or the line coupling, which can serve as a sanitary water outlet (1) or a sanitary line coupling, is distinguished by simple and rapid assembling and disassembling of the coupling or outlet parts (2, 3).

9 Claims, 12 Drawing Sheets

(56) References Cited

U.S. PATENT DOCUMENTS

2006/0283336 A1 12/2006 Eveleigh et al.
2008/0007044 A1 1/2008 Kertesz et al.

* cited by examiner

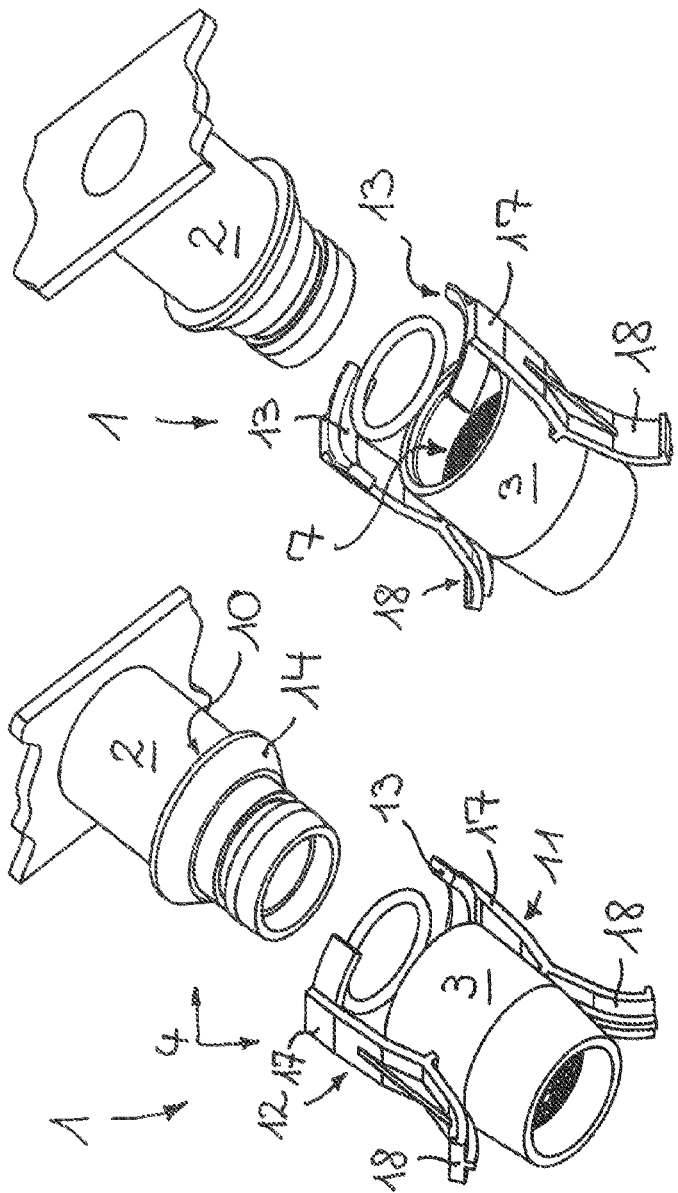

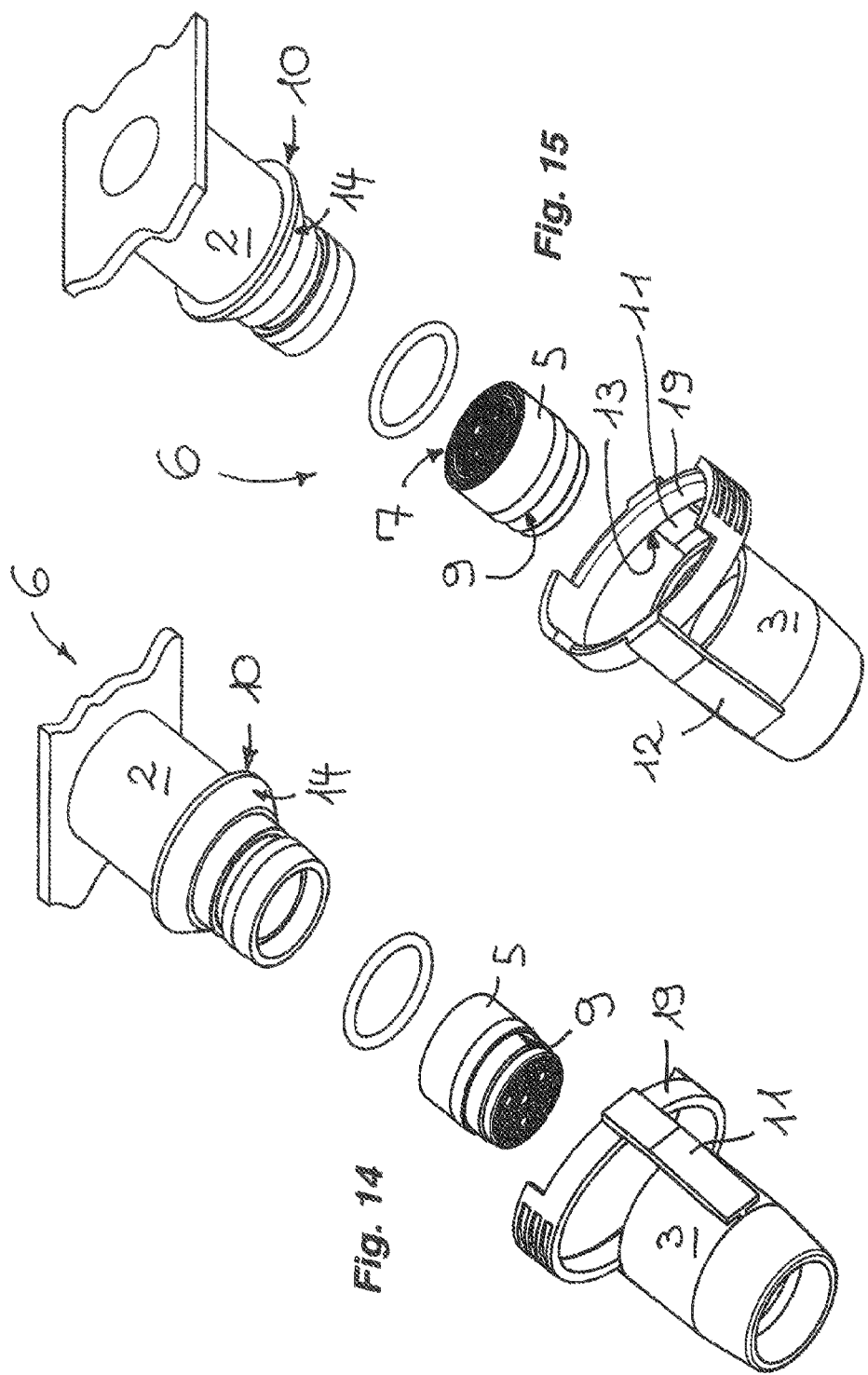

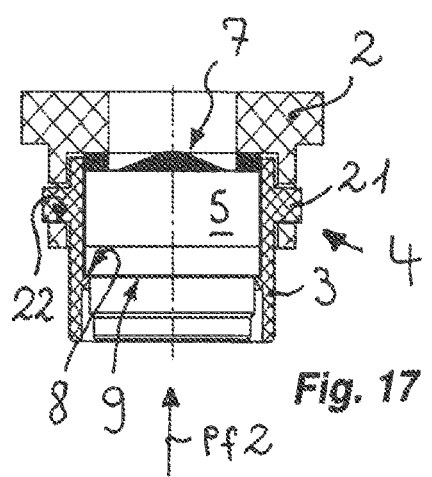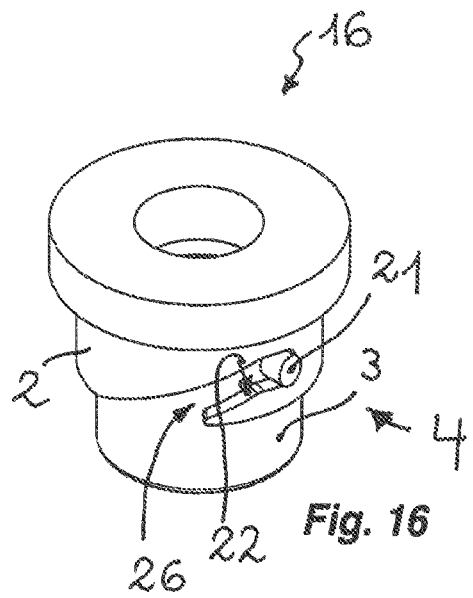

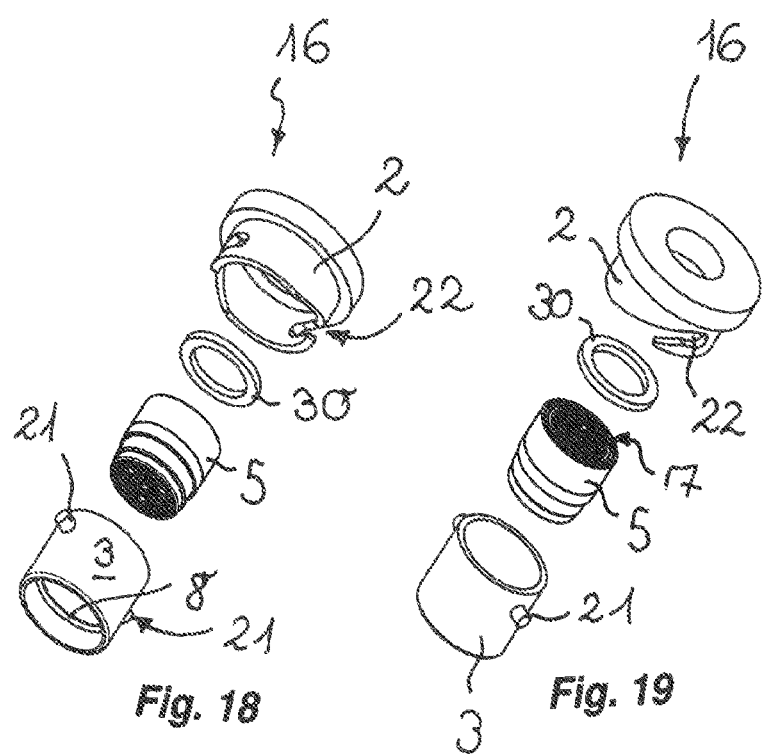

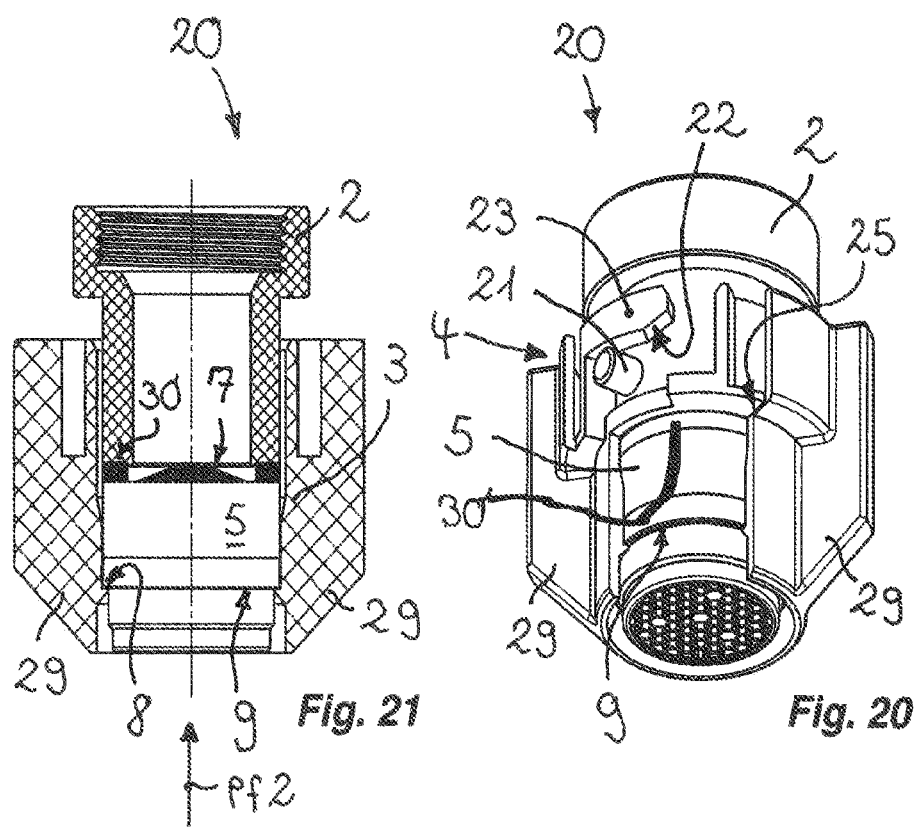

WATER OUTLET

CROSS-REFERENCE TO RELATED APPLICATIONS

This application is the U.S. National Phase of PCT Appln. No. PCT/EP2021/072803, filed Aug. 17, 2021, which claims priority to German Patent Application No. 20 2020 105 991.2, filed Oct. 20, 2020, the entire disclosures of which are incorporated by reference herein.

TECHNICAL FIELD

The invention relates to a water outlet, in particular a sanitary water outlet.

BACKGROUND

It is already known for a sleeve-shaped outlet mouthpiece to be assembled by way of a threaded connection on the outlet end of a sanitary outlet fitting, an insert cartridge being able to be inserted into said outlet mouthpiece. An aerated or non-aerated jet regulator is typically disposed in this insert cartridge, said jet regulator having to shape the water flowing out of the outflow end of the outlet fitting so as to form a spray jet formed by individual jets emerging separately from one another, or so as to form one homogenous, non-splashing overall jet. In the previously known insert cartridges, an attachment screen which has to filter out the residues of limescale or similar dirt particles contained in the inflowing water before these can compromise the fine structures in the jet regulator is in most instances disposed upstream of the jet regulator. Sanitary insert cartridges, in which a flow regulator or flow restrictor which has to restrict the quantity of water flowing through per unit of time or to adjust said water to a maximum value, established in a pressure-independent manner, is disposed between the attachment screen and the jet regulator, are also already known.

Such previously known water outlets, which are connected to the outlet fitting or any other inflow-proximal line portion by way of a screw thread, can in most instances be assembled or disassembled only with a certain level of complexity. If the water outlet and the insert cartridge located thein have to be replaced or exchanged at intervals, a comparatively minor level of complexity in terms of assembly and disassembly is desirable. For example, the insert cartridges used in a hospital have to be replaced at regular intervals for hygiene reasons. Spray-irrigation systems for watering plants, in which a plurality of water outlets disposed at small mutual spacings are provided on one water line are also already known. A water outlet which can be connected to an inflow-proximal line portion with a reduced level of complexity in terms of assembly and disassembly is desirable in particular in such specific applications.

SUMMARY

Therefore, there is the object of achieving a water outlet of the type mentioned at the outset, which requires significantly reduced complexity in terms of assembly and disassembly.

The achievement this object includes the use of one or more of the features disclosed herein in the water outlet of the type mentioned at the outset.

The water outlet according to the invention has an inflow-proximal first outlet part and an outflow-proximal second outlet part which are movable between a releasing position and a use position. The outlet parts of the water outlet according to the invention here in the use position thereof are connected to one another in the flow direction and are able to be releasably fixed to one another by means of a threadless quick-release coupling. Because the inflow-proximal first outlet part and the sleeve-shaped outflow-proximal second outlet part can be releasably fixed to one another by way of a threadless quick-release coupling, rapid assembling and disassembling of these outlet parts is possible. The rapid assembling and disassembling of the water outlet according to the invention can be utilized for installing or dismantling jet-forming and/or jet-regulating elements located in a sleeve interior of the inflow-proximal first outlet part and/or of the outflow-proximal second outlet part. In order to additionally facilitate inserting or removing of these jet-forming and/or jet-regulating elements from the sleeve interior of the inflow-proximal first outlet part and/or of the outflow-proximal second outlet part, it can be expedient for these jet-forming and/or jet-regulating elements to be held in an insert cartridge, which can be inserted or screwed into the sleeve interior of at least one of the outlet parts.

In the water outlet according to the invention, it can be expedient for an insert cartridge, which has a jet regulator and/or a flow regulator and/or an attachment screen, to be able to be inserted or screwed into the sleeve interior of the outflow-proximal second outlet part. While the jet regulator located in the insert cartridge has to shape the water flowing through so as to form one emerging spray jet consisting of a plurality of separate individual jets, or a homogenous non-splashing overall jet, the flow regulator serves for restricting the quantity of water flowing per unit of time, or to adjust said water in a pressure-independent manner to an established maximum value. If the insert cartridge provided in the water outlet according to the invention additionally or alternatively also has an attachment screen, this attachment screen serves to filter out the limescale residues and similar dirt particles potentially contained in the inflowing water before these dirt particles can compromise the functioning of the outflow-proximal jet regulator, attachment screen and/or flow regulator disposed downstream thereof.

Additionally or alternatively, a further proposal of independent relevance in terms of protection for achieving the object set out above lies in the features of the applicable coordinated claim 3. In the subject matter of the invention described in coordinated claim 3, it is characterizing that the quick-release coupling between the inflow-proximal first outlet part and the outflow-proximal second outlet part is held externally on the first outlet part so as to be axially spaced apart from the second outlet part. Because the quick-release coupling between the outlet parts is held externally on the first outlet part and disposed on the first outlet part so as to be axially spaced apart from the second outlet part, the handling of this quick-release coupling and the rapid assembling and disassembling of the outlet parts that are able to be connected to one another by way of the quick-release coupling is significantly simplified.

It is possible that the insert cartridge that supports the jet regulator and/or the flow regulator and/or the attachment screen can be inserted into the sleeve interior of the inflow-proximal first outlet part. However, such an insert cartridge can be inserted, and if required also removed again, in a significantly simpler manner when the insert cartridge can be inserted from the inflow-proximal end side of the outflow-proximal second outlet part into the sleeve interior of this second outlet part. Because the second outlet part in the releasing position is separated from the first outlet part, the insert cartridge can be released from the installed situation which is tight in the use position, so as to subsequently remove the insert cartridge from the sleeve interior in the second outlet part and to replace said insert cartridge.

An embodiment in which the insert cartridge is insertable into the sleeve interior of the outflow-proximal second outlet part until this insert cartridge bears on an insertion detent provided on the sleeve internal circumference of the second outlet part is preferable here. This insertion detent delimits the insertion movement of the insert cartridge in the second outlet part.

An embodiment according to the invention, which is particularly simple in terms of construction, provides that the insertion detent is configured as an annular shoulder encircling the sleeve internal circumference of the second outlet part. Such an insertion detent, which is configured as an encircling annular shoulder, does not require any anti-rotation safeguard between the insertion detent and the insert cartridge bearing on the insertion detent.

It is particularly advantageous for the insert cartridge to have a cartridge housing which, on the housing external circumference thereof, has a counter-detent which is preferably configured as an annular flange or annular shoulder and which bears on the insertion detent in the use position. If a counter-detent configured as an annular flange or annular shoulder is provided on the cartridge housing of the insert cartridge, the insert cartridge is securely and fixedly held in the second outlet part even in the event of high water pressures, without attention having to be paid to the relative position of this insert cartridge in relation to the second outlet part when installing said insert cartridge.

One advantageous exemplary application for the water outlet according to the invention provides that a corresponding insert cartridge is fastened to the outlet end of a sanitary outlet fitting in a rapid and easily releasable manner with the aid of this water outlet according to the invention. However, it is also possible for the water outlet according to the invention to be a component part of a plant irrigation system, and for the plant irrigation system to preferably have a plurality of mutually spaced apart water outlets.

One preferred exemplary embodiment according to the invention provides that the threadless quick-release coupling between the coupling or outlet parts is configured as a plug/twist connection. Such a plug/twist connection allows the rapid and nevertheless load-bearing connection of the outlet parts without a threaded connection between the outlet parts having to be provided for this purpose.

The outflow-proximal second outlet part, in the use position thereof, can be fixed in a simple and load-bearing manner to the inflow-proximal first outlet part when an annular flange or annular shoulder of the quick-release coupling is provided on the external circumference of the one, and preferably the first, outlet part, and when at least one spring web of the quick-release coupling is provided on the other, and in particular the second, outlet part, which spring web is movable between a decompressed releasing position and a holding position which is compressed in comparison to the former, in which holding position the at least one spring web engages behind the annular shoulder or annular flange of the quick-release coupling by way of a latching cam molded on the free web end of said spring web. The quick-release coupling between the outlet parts can be rapidly released by simply decompressing the at least one spring web when the second outlet part is to be released from the first outlet part, and the sleeve interior of the second outlet part is to be subsequently accessed.

In that respect, a particularly load-bearing and nevertheless simple embodiment according to the invention provides that, on one of the outlet parts, and in particular on the second outlet part, at least two spring webs, which are preferably disposed in pairs on opposite sides of this outlet part, are provided.

The handling of the spring webs can be additionally simplified, and the spring webs, which are assigned to one another in pairs, can be moved to the releasing position thereof in a practically simultaneous and simple manner when the spring webs are connected by way of an elastically deformable connection ring which engages on both sides of the spring webs, and when the spring webs are able to be decompressed from the holding position thereof into the releasing position by impinging the external side of the connection ring with pressure in at least one ring portion which is spaced apart from the water outlet. In this way, the spring webs which are assigned to one another in pairs can be moved simultaneously into the releasing position thereof by a simple impingement of the external side of the connection ring with pressure, in which releasing position the outflow-proximal second outlet part can be separated from the inflow-proximal first outlet part.

An embodiment according to the invention, which is particularly suitable in functional terms, provides that the connection ring has an approximately oval annular shape, and that the spring web pair is molded on the connection ring on the sub-regions of the oval annular shape that lie closest opposite one another. By impinging the connection ring with pressure, in particular on the sub-regions thereof that lie on the outside of said connection ring, the connection ring can be changed from the oval annular shape thereof to an almost circular annular shape in such a manner that the spring web pair can decompress into the releasing position thereof.

A functional embodiment according to the invention, which is particularly easy to handle, provides that the at least one spring web is molded on the outlet part in a web portion of this spring web that is spaced apart from the two web ends; that the web portion subdivides this spring web into two web arms of which a first web arm supports the latching can on the free web end thereof, and of which a second web arm is configured as a push button; and that the at least one spring web is elastically pivotable about a pivot axis disposed in the region between the web portion and the outlet part molded thereon in such a manner that the at least one spring web, by impinging the push button thereof with pressure, is movable from the holding position into the releasing position.

A particularly advantageous refinement according to the invention provides that the one outlet part, and preferably the inflow-proximal outlet part, has at least one coupling pin; that the at least one coupling pin is insertable into an assigned coupling opening on the other outlet part; that the at least one coupling pin and the assigned insertion opening of the quick-release coupling are able to be connected to one another in a plug-in direction which is oriented transversely to the longitudinal extent of the outlet parts; and that the outlet parts are able to be secured against the release of the at least one coupling pin from the plug-in opening assigned thereto, counter to the plug-in opening, with the aid of a sleeve-shaped securing element, which in a form-fitting manner encompasses the outlet parts in the use position of the latter.

This refining embodiment according to the invention can be configured as a water outlet, and in particular as a sanitary water outlet, in which an insert cartridge which contains a jet regulator and/or a flow regulator and/or an attachment screen is able to be inserted in the sleeve interior of at least one outlet part, and in particular of the outflow-proximal outlet part.

If this refining embodiment is configured as a water outlet, an insert cartridge can be inserted or screwed into at least one of the outlet parts, and preferably into the outflow-proximal second outlet part. In order to securely connect the outlet parts assigned to one another in a fluid-tight manner, an additional safeguard may be provided, which is formed by means of, for example, a groove-and-cam solution on the inflow-proximal first outlet part and on the inside of a sliding sleeve that engages across the outlet parts in the holding position. This sliding sleeve can also have an encircling protrusion on the sleeve internal circumference thereof, and can be securely mutually connected by way of corresponding holding means on the external circumference of the inflow-proximal first outlet part, or vice versa.

A particularly simple embodiment according to the invention, which is simple to produce, provides that the inflow-proximal first outlet part has an introduction slot, and that at least one introduction wing projects on the circumference of the outflow-proximal second outlet part, which introduction wing is able to be pushed transversely to the longitudinal extent of the second outlet part into the introduction slot up to the use position. In this advantageous embodiment of the water outlet according to the invention, the outflow-proximal second outlet part, by way of the at least one circumferentially projecting introduction wing thereof, can be pushed into an introduction slot, which is provided laterally on the inflow-proximal first outlet part. The at least one introduction wing on the outflow-proximal second outlet part is pushed into the introduction slot of the first outlet part transversely to the longitudinal extent of the latter up to the use position, in which the outlet parts are mutually aligned in the flow direction.

The handling of the quick-release coupling which connects the outlet parts to one another is significantly simplified when the introduction wing is configured as an annular flange encircling the second outlet part. In this way, the introduction wing which is provided on the second outlet part can be moved in a simple manner laterally into the introduction slot on the first outlet part in each rotary position of the second outlet part.

A further, particularly simple and advantageous embodiment of the invention provides that the plug/twist connection is configured as a bayonet connection or a bayonet cap, and that one of the outlet parts is able to be pushed onto the other outlet part in such a manner until a coupling pin or similar coupling protrusion, which projects on the one outlet part on the external or internal circumference, engages behind a peripheral region which is provided on the other outlet part and is oriented transversely to the introduction direction.

In order to facilitate the simple handling of the water outlet having such a bayonet connection or bayonet cap, it is advantageous for one of the outlet parts to be able to be pushed onto the other outlet part in such a manner until a push-fit detent provided on one of the outlet parts delimits the insertion movement or push-fit movement of the outlet parts toward one another.

One embodiment according to the invention, which is particularly simple in terms of construction and easy to produce, provides that the push-fit detent is configured as an annular shoulder.

In order to be able to carry out the plug/twist movement required for activating the quick-release coupling in a simple manner, it is advantageous for at least one activation element to be provided on the external circumference and preferably projects radially on the outlet part that is able to be pushed onto the other outlet part. The at least one activation element which is provided on the external circumference and preferably projects radially facilitates the plug movement and in particular also the twist movement of the outlet parts relative to one another, which is required for activating the quick-release coupling provided between the outlet parts.

A particularly advantageous and practicable embodiment according to the invention provides that the at least one activation element is configured as an activation wing, and that at least two activation wings, which preferably are mutually spaced apart at equal distances, project on the outlet part.

BRIEF DESCRIPTION OF THE DRAWINGS

The invention will be described in more detail hereunder by means of preferred exemplary embodiments. Further features of the invention are derived from the description hereunder of exemplary embodiments according to the invention in conjunction with the claims and the drawings.

In the drawings:

FIG. 4 shows the water outlet from FIGS. 1 to 3 in a perspective illustration of the individual parts, with a view onto the outflow side of the component parts thereof, wherein the outflow-proximal outlet part is shown in two positions which are increasingly spaced apart from the inflow-proximal outlet part;

FIG. 5 shows the water outlet from FIGS. 1 to 4 in an exploded individual illustration, with a view onto the inflow side of the component parts thereof, wherein the outflow-proximal outlet part is shown in two positions which are increasingly spaced apart from the inflow-proximal outlet part;

FIG. 14 shows the water outlet from FIGS. 6 to 13 in an exploded perspective illustration of the component parts thereof, with a view onto the outflow side of these component parts;

FIG. 15 shows the water outlet from FIGS. 16 to 14 in an exploded perspective illustration of the component parts thereof, with a view onto the inflow side of these component parts;

FIG. 16 shows a water outlet, shown in a perspective illustration, having an inflow-proximal first outlet part and an outflow-proximal second outlet part, which outlet parts are able to be connected to one another by way of a quick-release coupling, which is configured here as a plug/twist connection and especially as a bayonet connection or bayonet cap;

FIG. 17 shows the water outlet from FIG. 16 in a longitudinal section through the outlet parts thereof, which here are connected to one another in the use position, wherein an insert cartridge is disposed in the outflow-proximal second outlet part, which is configured so as to be sleeve-shaped;

FIG. 18 shows the water outlet from FIGS. 16 and 17 in an exploded perspective illustration, with a view onto the outflow side of the individual component parts of the water outlet;

FIG. 19 shows the water outlet from FIGS. 16 to 18 in an exploded perspective view, with a view onto the inflow-proximal end face of the component parts of the water outlet;

FIG. 20 shows a water outlet, shown in a perspective illustration, in which the quick-release coupling provided between the outlet parts is likewise configured as a bayonet connection or bayonet cap, wherein the outlet parts of this water outlet here are illustrated in the use position thereof, in which they are connected to one another;

FIG. 21 shows the water outlet from FIG. 20 in a longitudinal section through the outlet parts thereof, which are connected to one another;

DETAILED DESCRIPTION

Figure 1:
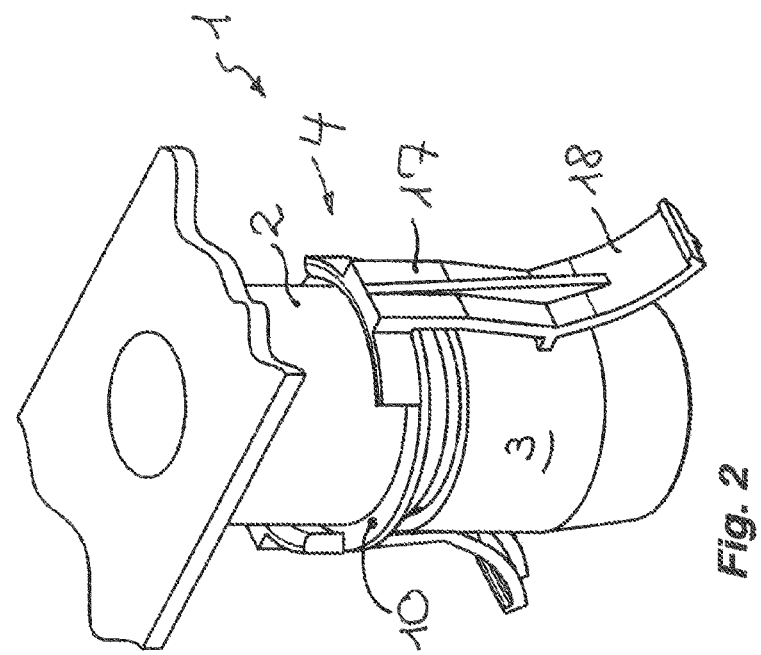
FIG. 1 shows a water outlet, here illustrated in a longitudinal section, having an inflow-proximal outlet part and an outflow-proximal outlet part, which outlet parts in the use position thereof are fixed to one another by means of a quick-release coupling which has spring webs disposed on opposite sides of the water outlet.
Figure 2:
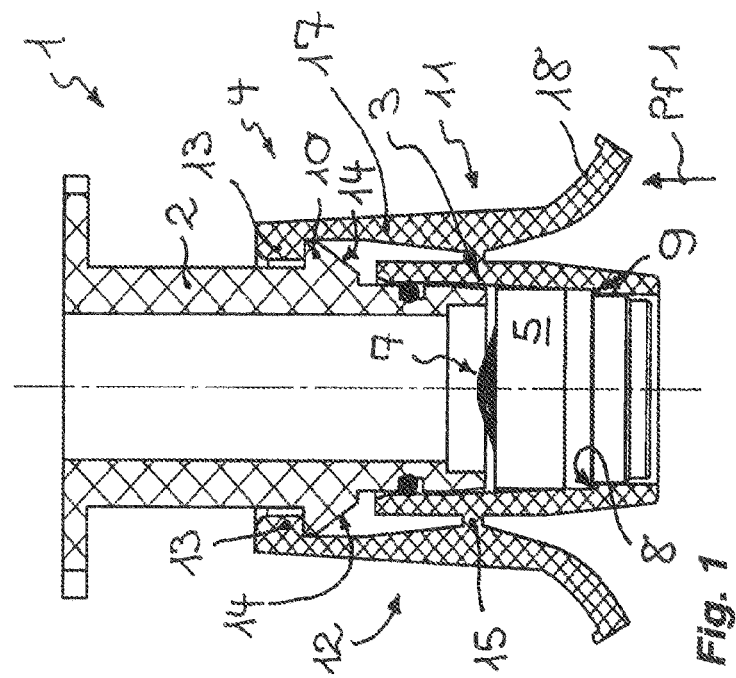
FIG. 2 shows the water outlet from FIG. 1 in a perspective illustration, with a view onto the outlet parts thereof, wherein the outlet parts of the water outlet here are in the use position thereof, in which they are fixed to one another.
Figure 3:
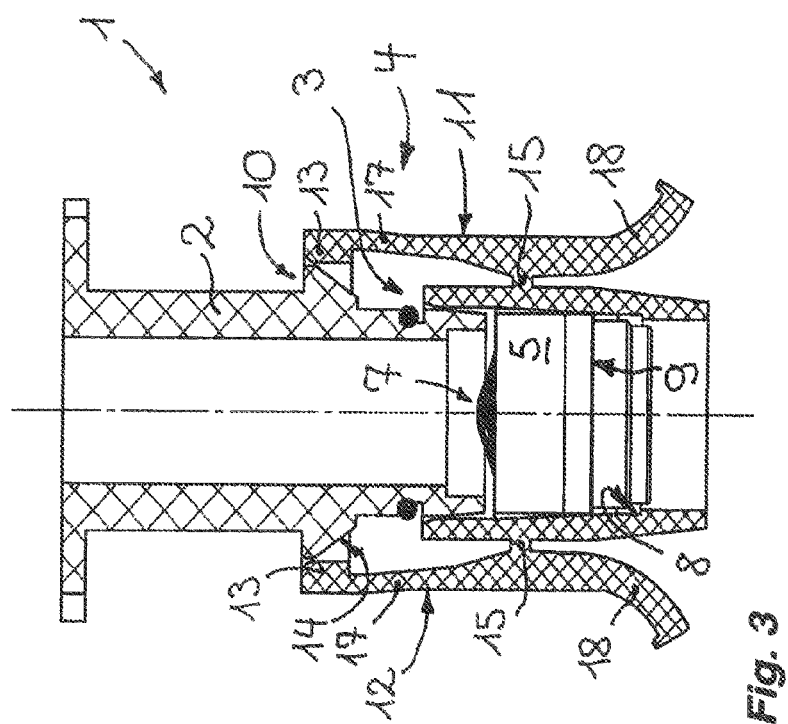
FIG. 3 shows the water outlet from FIGS. 1 and 2, likewise illustrated in a longitudinal section, wherein the outlet parts here move into the mutually separated releasing position thereof, and wherein the spring webs of the quick-release coupling, which connects the outlet parts to one another, are sufficiently decompressed here.
Figure 7:
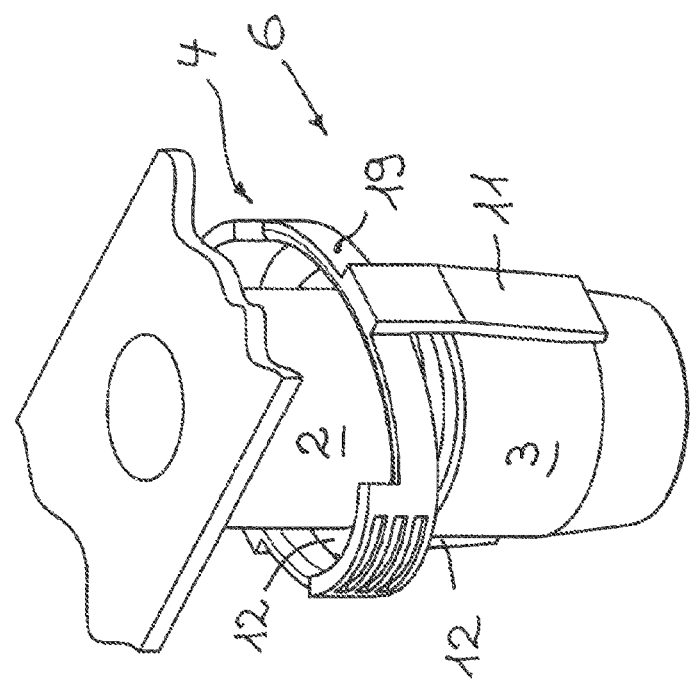
FIG. 7 shows the water outlet from FIG. 6 in a perspective illustration, with a view onto the inflow side of the component parts thereof.
Figure 6:
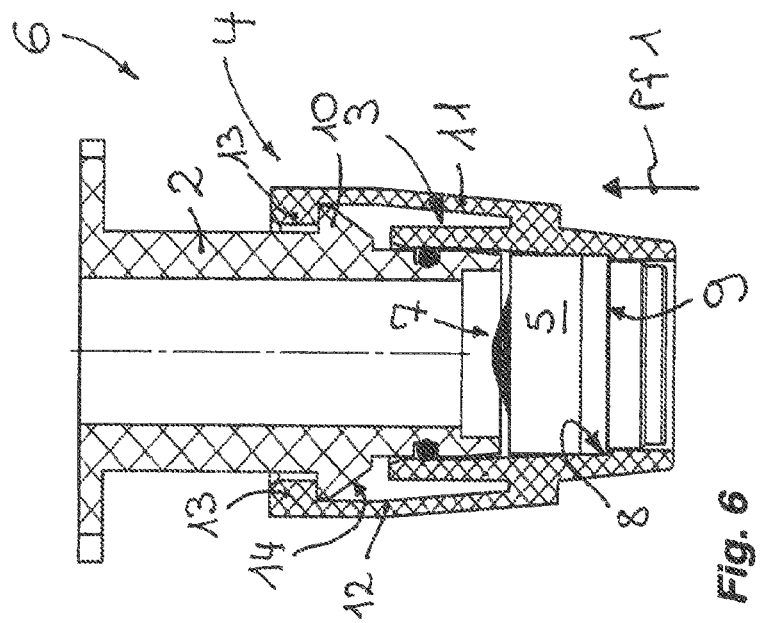
FIG. 6 shows a further exemplary embodiment of a water outlet designed in a manner comparable to FIGS. 1 to 5, wherein the quick-release coupling, which is required for fixing the outlet parts in the use position, has two spring webs which are disposed on opposite sides of the water outlet and can be activated by way of a common oval connection ring.
Figure 8:
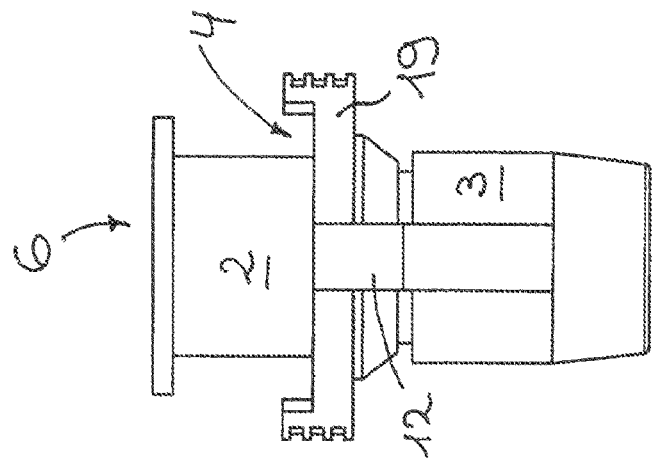
FIG. 8 shows the water outlet from FIGS. 6 and 7 in a perspective illustration, with a view onto the outflow side of the component parts thereof.
Figure 9:
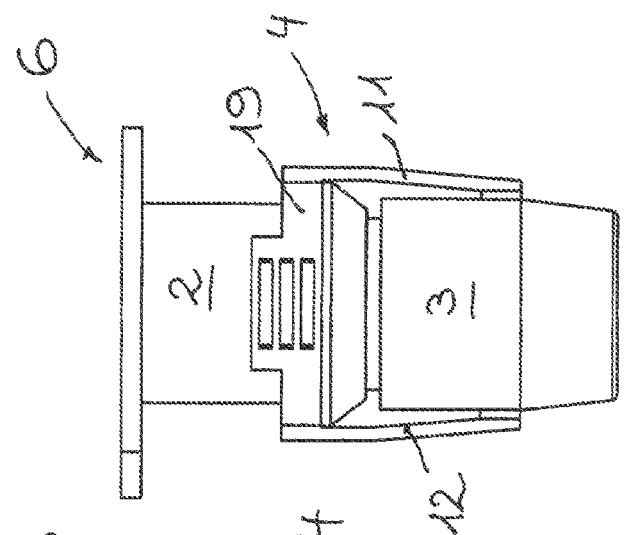
FIG. 9 shows the water outlet from FIGS. 6 to 8 in a lateral view.
Figure 10:
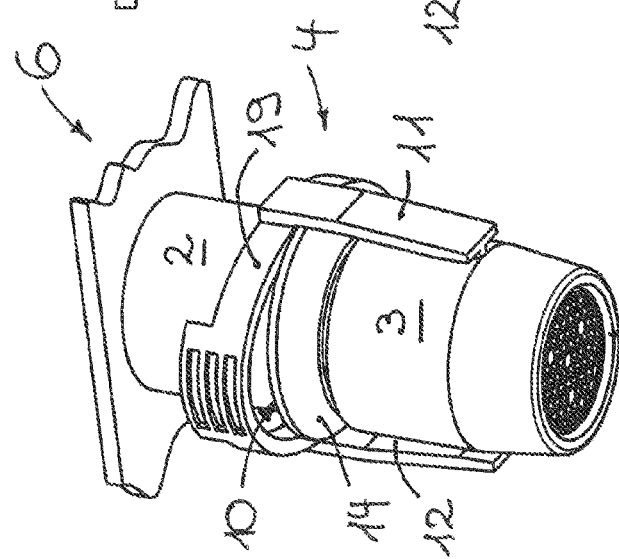
FIG. 10 shows the outlet from FIGS. 6 to 9 in a lateral view rotated by 90° in relation to FIG. 9.
Figure 13:
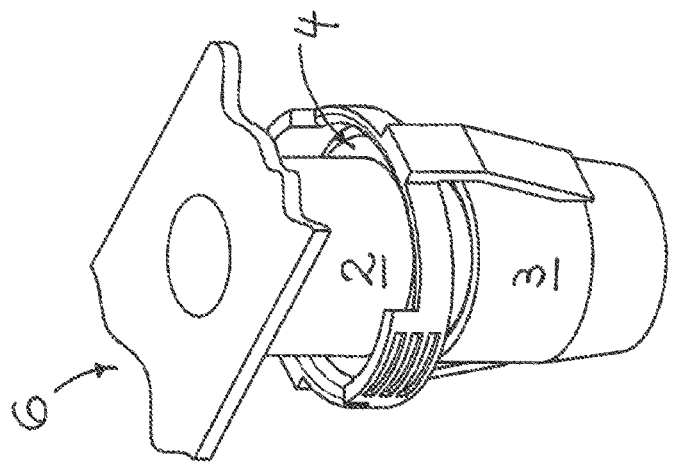
FIG. 13 shows the water outlet from FIGS. 6 to 12 in a perspective illustration, wherein the component parts of the water outlet here are illustrated in a view onto the outflow side of these component parts.
Figure 12:
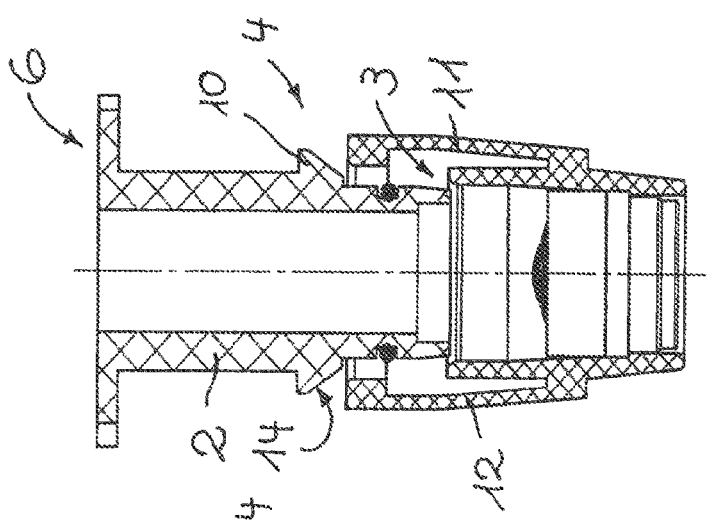
FIG. 12 shows the water outlet from FIGS. 6 to 11 in the releasing position of the outlet parts thereof, wherein here the outflow-proximal outlet part is already separated from the inflow-proximal outlet part, and the quick-release coupling provided for fixing the outlet parts to one another has already disengaged.
Figure 11:
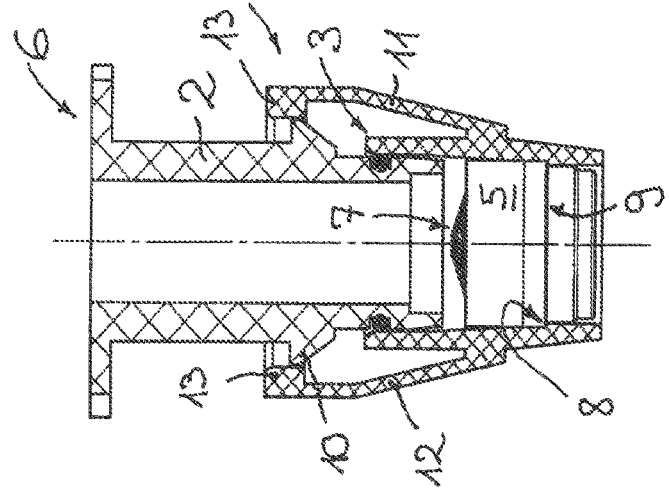
FIG. 11 shows the water outlet from FIGS. 6 to 10, wherein the outlet parts, here illustrated in a longitudinal section, move into the releasing position thereof, in which the outflow-proximal outlet part can be separated from the inflow-proximal outlet part.
Figures 22, 23:
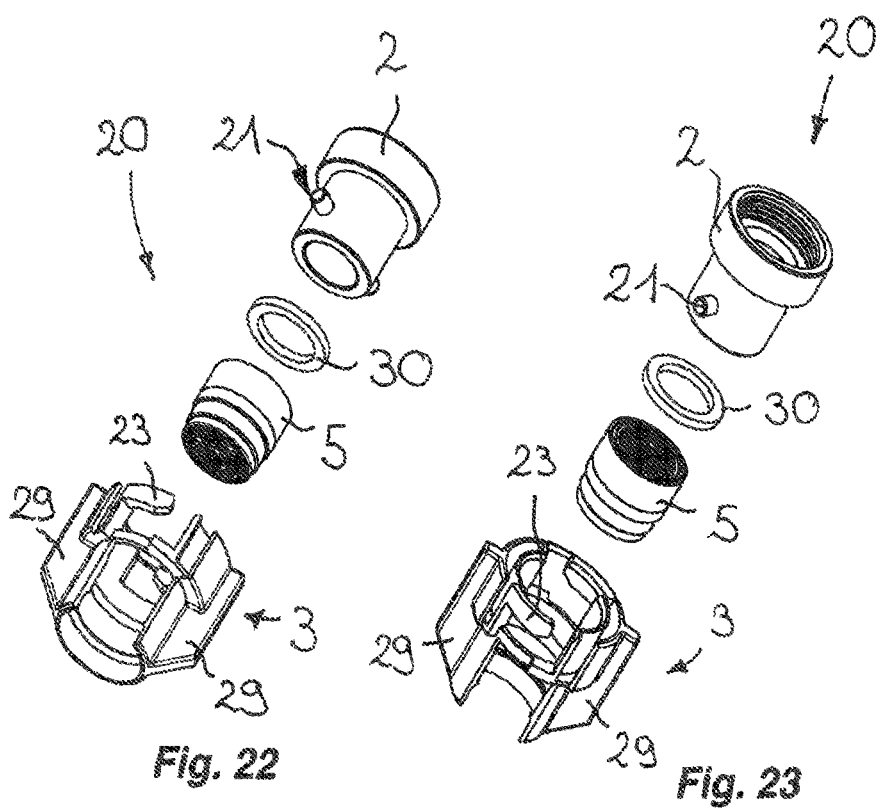
FIG. 22 shows the water outlet from FIGS. 20 and 21 in an exploded perspective illustration of the components thereof, with a view onto the outflow side of these component parts.
FIG. 23 shows the water outlet from FIGS. 20 to 22 in an exploded perspective illustration, with a view onto the inflow-proximal end face of the component parts of this water outlet.

Various embodiments 1, 6, 16, 20 and 24 of a sanitary water outlet are illustrated in FIGS. 1 to 25. The water outlets 1, 6, 16, 20 and 24 illustrated here are provided on an outflow-proximal end or one of the outflow-proximal ends of a water line, so as to form the water flowing out of the latter, and allow said water to emerge from the latter, as a homogenous overall jet or as a spray jet formed from a plurality of individual jets.

The water outlets 1, 6, 16, 20 and 24 illustrated here have in each case one inflow-proximal first outlet part 2 and one outflow-proximal second outlet part 3 which are movable relative to one another between a releasing position, illustrated in FIGS. 4 and 5, 14 and 15, 18 and 19, and 22 and 23, respectively, and a use position, shown in FIGS. 1 to 3, 6 to 13, 16 to 17, 20 to 21 and 24 to 25, and are able to be fixed to one another in the use position.

In the use position, the first outlet part 2 and the second outlet part 3, configured so as to be sleeve-shaped, are connected to one another and are able to be releasably fixed to one another by means of a threadless quick-release coupling 4. As can be seen from the sectional illustrations in FIGS. 1, 3, 6, 11, 12, 17, 21 and 25, an insert cartridge 5 which has a jet regulator and/or a flow regulator and/or an attachment screen can be inserted into the sleeve interior of the outflow-proximal second outlet part 3. While the jet regulator located in the insert cartridge 5 has to shape the outflowing water into a spray jet or into a homogenous and non-splashing overall jet, the flow regulator is to restrict the water quantity flowing out per unit of time or to adjust said water to a maximum pressure, established in a pressure-independent manner. The attachment screen 7 disposed upstream on the insert cartridge 5 is to filter out the limescale or other dirt particles entrained in the inflowing water, before said particles can compromise the functionality of the flow regulators or jet regulators disposed downstream in the insert cartridge 5.

As becomes evident from a comparison of FIGS. 1 to 25, the quick-release coupling 4 can be held on the external side on the first outlet part 2 and, in the use position, be disposed so as to be axially spaced apart from the second outlet part 3.

It becomes evident from a comparison of FIGS. 1, 3, 6, 11, 12, 14, 15, 18 to 19, 22 to 23 and 25 that the insert cartridge 5 can be inserted into the sleeve interior of the second outlet part 3 from the inflow-proximal end side of the outflow-proximal outlet part 3 until at least one counter-detent on the external circumference on the insert cartridge 5 bears on at least one insertion detent on the internal circumference of the second outlet part 3. This insertion detent and/or the counter-detent can in each case be configured as an annular shoulder 8, 9, the latter encircling the sleeve internal circumference of the second outlet part 3 or the housing external circumference of the insert cartridge 5. This insertion detent and/or the counter detent can in each case be configured as an annular shoulder 8, 9, which run around the internal circumference of the sleeve of the second outlet part 3 or around the external circumference of the housing of the insert cartridge 5.

As becomes evident from a comparison of FIGS. 1 to 5 and 6 to 15, the water outlets 1, 6 shown there have, on the one, preferably first, outlet part 2 thereof, an annular shoulder or annular flange 10 of the quick-release coupling 4 on the external circumference, while, on the other, in particular second, outlet part 3, at least one spring web 11, 12, and preferably two spring webs 11, 12 disposed on opposite sides of the outlet part 3, are provided. These spring webs 11, 12 are movable between a releasing position, shown in FIG. 3 or 11 and 12, and a holding position which is compressed in comparison to the latter and can be seen in FIG. 1 or 6 and 7, in which holding position the spring webs 11, 12, in each case by way of a latching cam 13 molded on the free web end thereof, engage behind the annular shoulder or annular flange 10 of the quick-release coupling 4. The annular shoulder or annular flange 10, provided on the first outlet part 2, of the quick-release couplings 4 provided on the water outlets 1, 6 has a push-fit ramp 14 which preferably widens conically in the insertion direction Pf 1, which, when pushing the second outlet part 3 onto the first outlet part 2, initially causes the spring webs 11, 12 to decompress before these spring webs 11, 12, by way of the latching cam 13 thereof, engage behind the annular shoulder or the annular flange 10 and can compress again in the holding position.

As can be seen from FIGS. 1 to 5, the spring webs 11, 12 of the water outlet 1 shown there are, in a web portion 15 of these spring webs 11, 12 that is spaced apart from the two free web ends, molded on the second outlet part 3 such that this web portion 15 of the spring webs 11, 12 subdivides the latter into two web arms 17, 18, of which a first web arm 17 on the free web end thereof supports the latching cam 13, and of which a second web arm 18 is configured as a push button. The spring webs 11, 12 of the water outlet 1 here can be elastically pivoted about a pivot axis disposed in the region between the web portion 15 and the outlet part 3 molded on the latter in such a manner that the spring webs 11, 12 can in each case be moved from the holding position into the releasing position by a preferably simultaneous impingement with pressure of the web arms 18 serving as push buttons. The simultaneous activation of the spring webs 11, 12 here is facilitated in that these spring webs 11, 12 are disposed in pairs on opposite sides of this outlet part 3, and therefore can also be simultaneously activated in a simple manner by one hand of the user.

In order for the spring webs 11, 12 on the water outlet 1 to be able, by way of the latching cam 13 thereof, to engage behind the annular shoulder or annular flange 10 in a positive and load-bearing manner, the free web end on the web arm 17 is configured so as to be approximately T-shaped such that the latching cam 13, which is provided across at least a large sub-region of the longitudinal extent of the T-cross web, can engage behind the annular shoulder or annular flange 10 across a correspondingly large sub-region.

As can be seen from FIGS. 6 to 15, the spring webs 11, 12 of the water outlet 6, which are likewise disposed in pairs on opposite sides of the outflow-proximal outlet part 3, are connected to one another by way of an elastically deformable connection ring 19 which engages on the spring webs 11, 12 on both sides. This connection ring 19, which connects the spring webs 11, 12 to one another, in the relaxed position thereof has an oval shape, wherein the connection ring 19, by impinging with pressure the sub-regions of the connection ring 19 that are spaced apart from the spring webs 11, 12, can be elastically deformed to a substantially round shape. The spring web pairs 11, 12 are molded on the sub-regions of the oval annular shape of the connection ring 19 that lie closest opposite one another. If the connection ring 19, by impingement with pressure, is now changed from the relaxed oval annular shape thereof to an annular shape which is substantially circular in comparison to the latter, the spring webs 11, 12 molded thereon by way of the free web ends thereof are elastically decompressed in such a manner that these spring webs 11, 12, by way of the latching cams 13 thereof, are in each case in a releasing position in which releasing position of the spring webs 11, 12 the outflow-proximal outlet part 3 can be pulled off from the inflow-proximal outlet part 2 of the water outlet 6 and can be separated in a simple manner.

Illustrated in FIGS. 16 to 19 and 20 to 23 are water outlets 16 and 20 in which the quick-release coupling 4, which connects the outlet parts 2, 3 to one another in the use position, is configured as a plug/twist connection, and especially as a bayonet connection or bayonet cap. One of the outlet parts 2, 3, which is externally sealed by an axially effective annular seal 30, and here the respective outflow-proximal second outlet part 3, is able to be pushed onto the other outlet part, here the inflow-proximal first outlet part 2, until a coupling pin 21 which projects on the external circumference on the one outlet part 3 engages behind a peripheral region 22 which is provided on the other outlet part 2 and is oriented transversely to the plug-in or introduction direction Pf 2 of the outlet parts 2, 3. This peripheral region 22, in the water outlet 20 illustrated in FIGS. 20 to 23, is formed by the periphery of a catch 23 which faces away from the inflow-proximal first outlet part 2 and is oriented transversely to the longitudinal extent of the outlet parts 2, 3 and is formed from the circumferential wall of the outflow-proximal second outlet part 3. The outflow-proximal second outlet part 3 here is able to be pushed onto the inflow-proximal first outlet part 2 in such a manner until a push-fit detent 25 provided between the outlet parts delimits the plug or push-fit movement of the outlet parts 2, 3. This push-fit detent 25 is formed by an annular shoulder which is provided on the first outlet part and serves as a detent and interacts with an annular shoulder which is provided on the internal circumference of the outflow-proximal second outlet part and serves as a counter-detent.

In the water outlet 16 illustrated in FIGS. 16 to 19, the inflow-proximal first outlet part 2 has a slot 26 which is oriented transversely to the plug-in or introduction direction Pf 2 and ascends in the introduction direction Pf 2, the coupling pin 21 projecting on the external circumference of the outflow-proximal second outlet part 3 being able to be introduced into said slot 26. While the slot periphery which faces the outflow-proximal second outlet part 3 serves as an introduction detent, the opposite slot periphery 22 is engaged from behind by the coupling pin 21. The quick-release couplings 4 provided on the water outlets 16, 20 can be moved to the use position thereof or the releasing position thereof by simple plug and twist movements.

It can be seen in FIGS. 20 to 23 that at least one activation element is provided on the outlet part 3 of the water outlet 20 shown there, said outlet part 3 being able to be pushed onto the other outlet part 2. This radially projecting, at least one activation element here is configured as an activation wing 29, wherein at least two activation rings 29, which are preferably mutually spaced apart at equal distances, project on the outlet part 3 of the water outlet 20 illustrated here.

Figure 24:
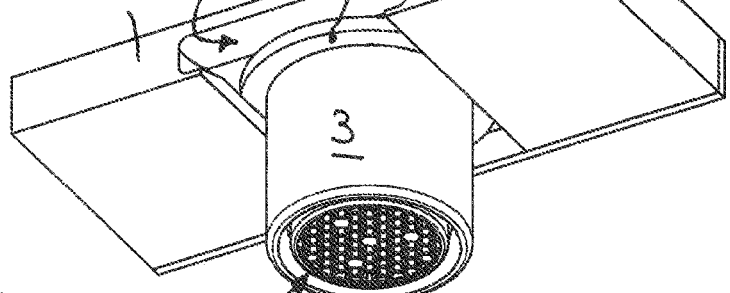
FIG. 24 shows a water outlet having an inflow-proximal first outlet part and an outflow-proximal second outlet part, wherein an introduction slot is provided on the inflow-proximal first outlet part, into which introduction slot the substantially sleeve-shaped second outlet part is able to be pushed up to the use position by way of an encircling introduction wing configured as an annular flange, in which use position the outlet parts are mutually aligned in the flow direction.
Figure 25:
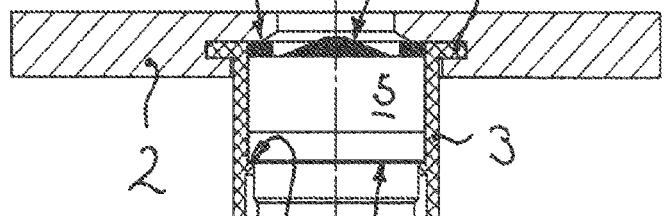
FIG. 25 shows the water outlet from FIG. 24 in a longitudinal section.

Illustrated in FIGS. 24 and 25 is a water outlet 24 in which the inflow-proximal first outlet part 2 has an introduction slot 27. At least one introduction wing, which here is configured as an encircling annular flange 28 on the second outlet part 3, is provided on the circumference on the outflow-proximal second outlet part 3. The outflow-proximal second outlet part 3, by way of the introduction wing thereof which projects on the circumference and is configured as an annular flange 28, can be pushed, transversely to the longitudinal extent of the second outlet part 3, into the introduction slot 27 provided on the first outlet part 2 up to the use position, in which the outlet parts 2, 3 are mutually aligned in the flow direction. The annular flange 28, which serves as an introduction wing, is disposed on the circumference on the inflow-proximal end periphery of the second outlet part 3 and is preferably integrally molded on the second outlet part 3.

When viewing FIGS. 1 to 25 in combination, it can be seen that the inflow-proximal first outlet part 2 can be configured as a separate component part of the water outlet, wherein such an inflow-proximal first outlet part 2 can be preferably releasably fastened to the outflow-proximal end of a sanitary outlet fitting. However, it is also possible that the outflow-proximal end region of the fitting body of a sanitary outlet fitting forms the inflow-proximal first outlet part 2, or is integrally connected to the latter.

LIST OF REFERENCE SIGNS

1 Water outlet according to FIGS. 1 to 5
2 Inflow-proximal first water outflow or water outlet part
3 Outflow-proximal second water outflow or water outlet part
4 Quick-release coupling
5 Insert cartridge
6 Water outlet according to FIGS. 6 to 15
7 Attachment screen
8 Annular shoulder serving as insertion detent
9 Annular shoulder serving as counter-detent
10 Annular flange or annular shoulder
11 Spring web on the water outlet 1, 6
12 Spring web on the water outlet 1, 6
13 Latching cam on the spring webs 11, 12
14 Push-fit ramp
15 Web portion on the two-armed spring web 11, 12 of the water outlet 1
16 Water outlet according to FIGS. 16 to 19
17 First web arm
18 Second web arm
19 Connection ring on the spring webs 11, 12 of the water outflow or water outlet 6
20 Water outlet according to FIGS. 20 to 23
21 Coupling pin
22 Peripheral region
23 Catch
24 Water outlet according to FIGS. 24 and 25
25 Push-fit detent
26 Coupling slot
27 Introduction slot
28 Annular flange
29 Activation element or activation wing
30 Annular seal
Pf 1 Insertion direction
Pf 2 Plug-in or introduction direction

The invention claimed is:

1. A water outlet (1, 6, 16, 20, 24), comprising:
an inflow-proximal, first outlet part (2);
an outflow-proximal, second outlet part (3) which (2, 3) is movable relative to the inflow-proximal first outlet part (2) between a releasing position and a use position, in which use position the first and second outlet parts (2, 3) are connected to one another in a flow direction and are releasably fixed to one another by a threadless quick-release coupling (4);
the quick-release coupling (4) between the first and second outlet parts (2, 3) is configured as a plug/twist connection, and the plug/twist connection is configured as a bayonet connection or bayonet cap;
one of the first or second outlet parts (2, 3) is pushable onto an other of the first or second outlet parts (2) until a coupling protrusion, which projects on the one of the first or second outlet parts (2) on an external or internal circumference thereof, engages behind a peripheral region which is provided on the other of the first or second outlet parts (3) and is oriented transversely to a plug-in or introduction direction (Pf 2);
the first and second outlet parts (2, 3) are externally sealed by an axially effective annular seal (30); and
at least one radially projecting activation element is provided on one of the first or second outlet parts (3) that is able to be pushed onto the other of the first or second outlet parts (2).

2. The water outlet (1, 6, 16, 20, 24) as claimed in claim 1, wherein the outflow-proximal second outlet part (3) is configured so as to be sleeve-shaped, and an insert cartridge (5) which has at least one of a jet regulator, a flow regulator, or an attachment screen (7) is screwable or insertable into a sleeve interior of the second outlet part (3).

3. The water outlet (1, 6, 16, 20, 24) as claimed in claim 2, wherein the insert cartridge (5) is insertable from an inflow-proximal end side of the outflow-proximal second outlet part (3) into the sleeve interior of the second outlet part (3) until the insert cartridge (5) bears on an insertion detent provided on a sleeve internal diameter of the second outlet part (3).

4. The water outlet (1, 6, 16, 20, 24) as claimed in claim 3, the insertion detent is configured as an annular shoulder (8) or annular flange encircling the sleeve internal circumference of the second outlet part (3).

5. The water outlet (1, 6, 16, 20, 24) as claimed in 3, wherein the insert cartridge (5) has a cartridge housing which, on a housing external circumference thereof, has a counter-detent which is preferably configured as an annular flange or annular shoulder (9) and which bears on the insertion detent in the use position.

6. The water outlet (20) as claimed in claim 1, wherein the one of the first or second outlet parts (2, 3) is pushable onto the other of the first or second outlet parts (2) r until a push-fit detent (25) provided on one of the first or second outlet parts (2, 3) delimits a push-fit movement.

7. The water outlet (20) as claimed in claim 6, wherein the push-fit detent (25) is configured as an annular shoulder.

8. The water outlet (20) as claimed in claim 1, wherein the at least one activation element comprises an activation wing (29), and at least two of the activation wings (29) project on the outlet part (3).

9. The water outlet (20) as claimed in claim 8, wherein the at least two of the activation wings (29) are mutually spaced apart at equal distances.

* * * * *